Nov. 25, 1947.  H. W. SEMAR  2,431,428
GEAR TIMING APPARATUS
Original Filed April 14, 1943  4 Sheets-Sheet 1
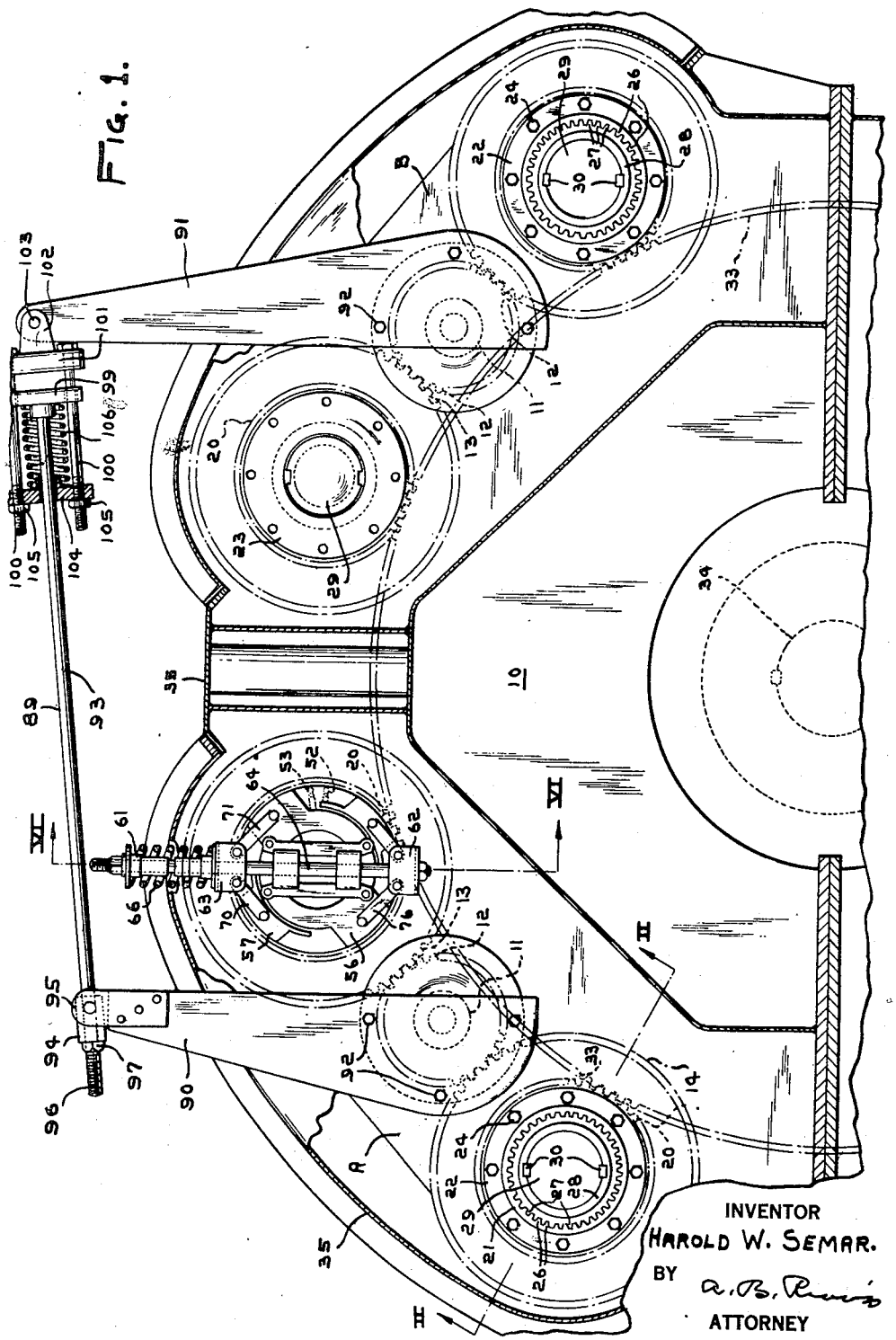
INVENTOR
HAROLD W. SEMAR.
BY
ATTORNEY Nov. 25, 1947.                H. W. SEMAR                2,431,428
                          GEAR TIMING APPARATUS
              Original Filed April 14, 1943    4 Sheets-Sheet 2
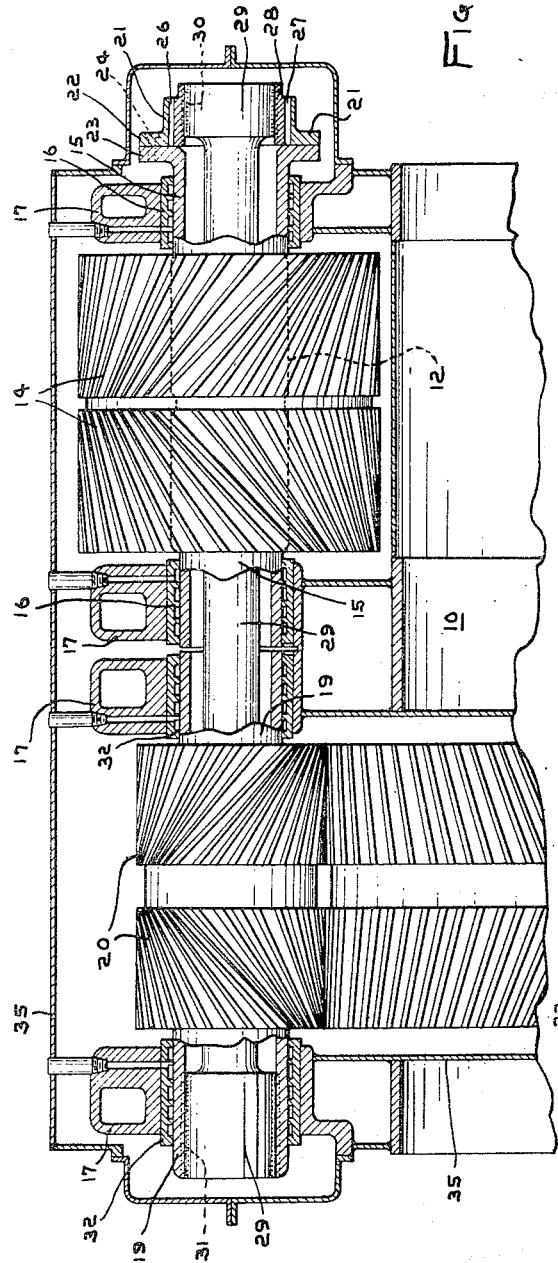
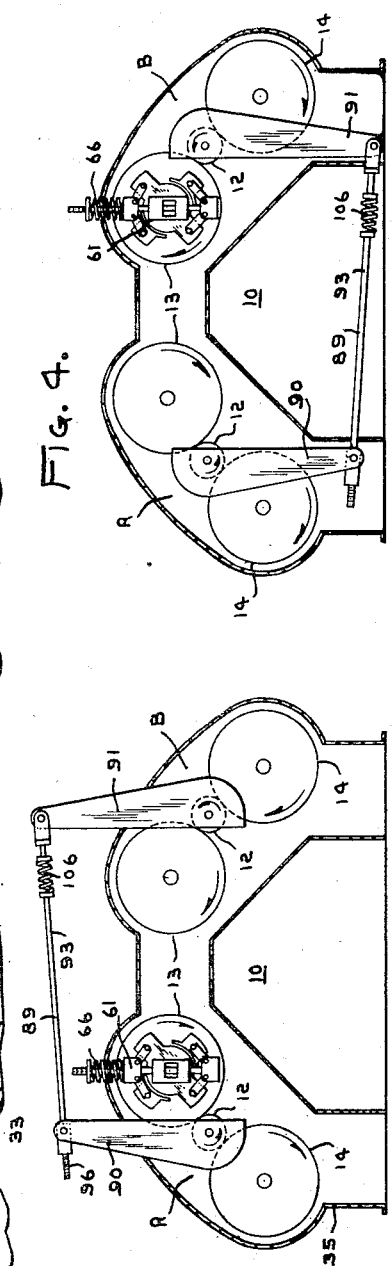
INVENTOR
HAROLD W. SEMAR.
BY
ATTORNEY Nov. 25, 1947.    H. W. SEMAR    2,431,428
GEAR TIMING APPARATUS
Original Filed April 14, 1943    4 Sheets-Sheet 3
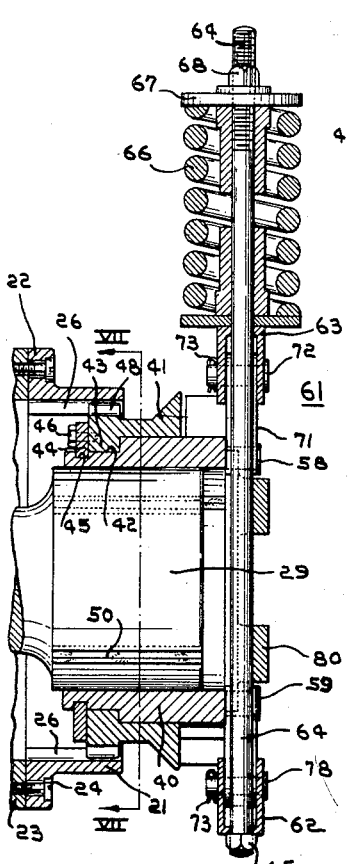
FIG. 6.
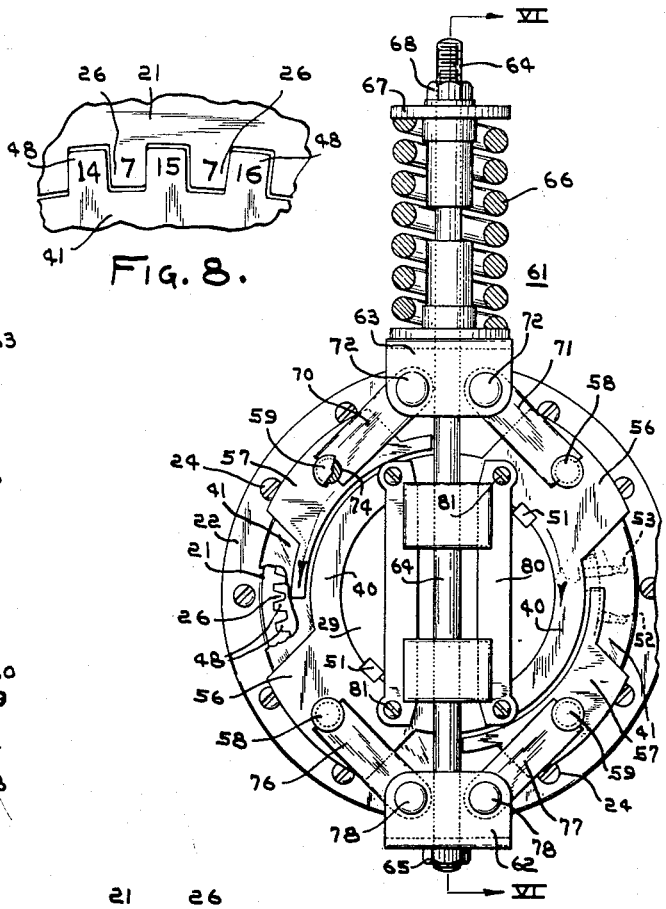
FIG. 8.
FIG. 5.
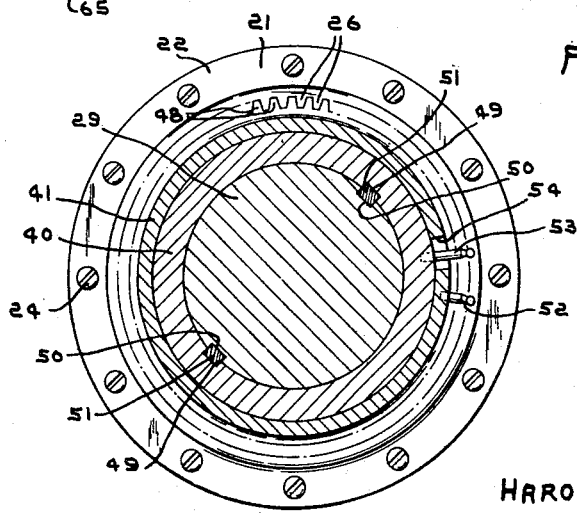
FIG. 7.
WITNESSES:
J. X. Mosser
S. K. Carter
INVENTOR
HAROLD W. SEMAR.
BY
ATTORNEY Nov. 25, 1947. H. W. SEMAR 2,431,428
GEAR TIMING APPARATUS
Original Filed April 14, 1943 4 Sheets-Sheet 4
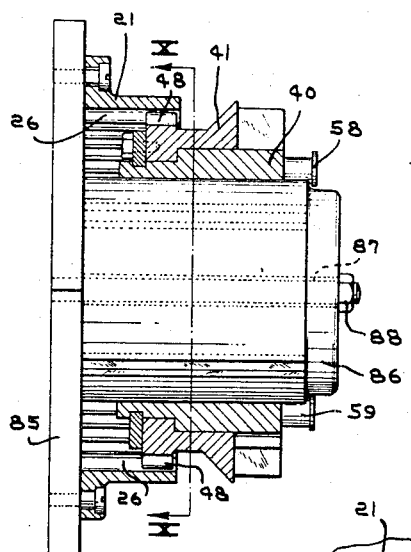
FIG. 9.
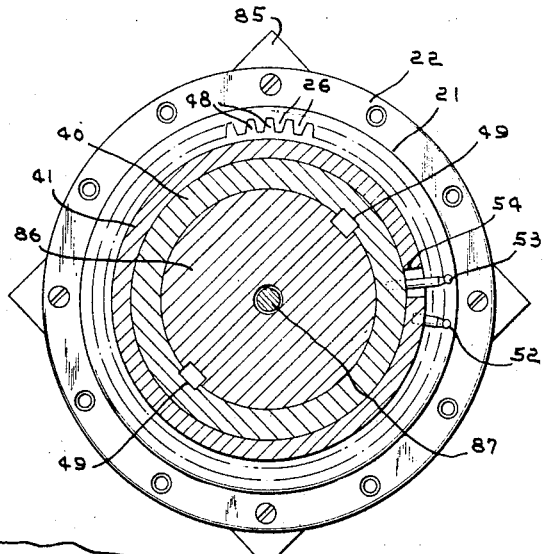
FIG. 10.
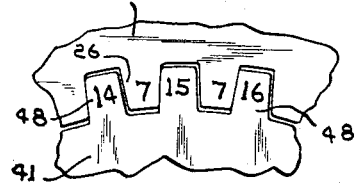
FIG. 11.
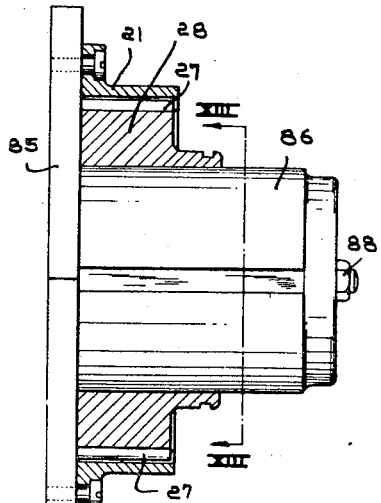
FIG. 12.
WITNESSES:
J. K. Messer
D. K. Carter
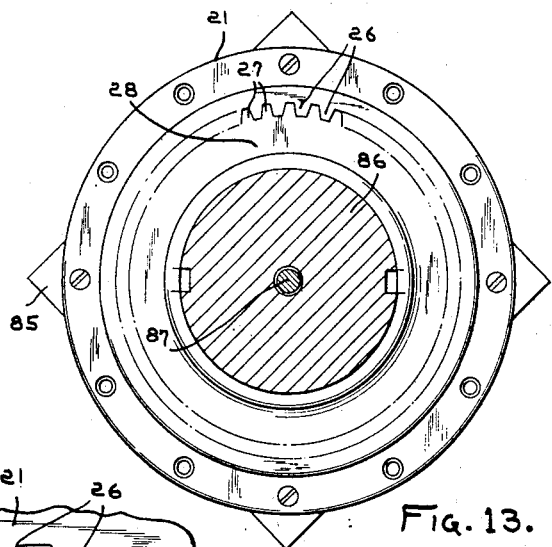
FIG. 13.
FIG. 14.
INVENTOR
HAROLD W. SEMAR.
BY
ATTORNEY Patented Nov. 25, 1947

2,431,428

UNITED STATES PATENT OFFICE 2,431,428

GEAR TIMING APPARATUS

Harold W. Semar, Drexel Hill, Pa., assignor to Westinghouse Electric Corporation, East Pittsburgh, Pa., a corporation of Pennsylvania Original application April 14, 1943, Serial No. 482,977. Divided and this application February 3, 1945, Serial No. 576,053

2 Claims. (Cl. 73—162)

This invention relates to gearing, more particularly to reduction gearing of the locked-train type, and it has for an object to provide improved apparatus for dividing between the two high-speed gears, the torque delivered thereto by the high-speed pinion.

Another object of the invention is to provide improved apparatus for obtaining equal division, between the high-speed gears of a locked-train reduction gear assembly, of the torque delivered thereto by the high-speed pinion.

These and other objects are effected by the invention as will be apparent from the following description and claims taken in connection with the accompanying drawings, forming a part of this application, in which:

Fig. 1 is an end view of a reduction gear assembly such as might be used in ship propulsion for driving from two sources of power to a single power shaft, together with the apparatus involved in this invention for dividing between the two high-speed gears, the torque delivered thereto by the high-speed pinion;

Fig. 2 is a sectional view taken along the line II—II of Fig. 1, looking in the direction indicated by the arrows;

Figs. 3 and 4 are similar diagrammatic views illustrating the difference in application of the apparatus for adjusting the torque in the left-hand gear train (Fig. 3) and the right-hand gear train (Fig. 4);

Fig. 5 is a front elevational view of a torquing jig and associated apparatus for performing one step of the invention covered by this application;

Fig. 6 is a transverse sectional view taken along the line VI—VI of Fig. 5, looking in the direction indicated by the arrows;

Fig. 7 is a sectional view taken along the line VII—VII of Fig. 6, looking in the direction indicated by the arrows;

Fig. 8 is a fragmentary view of a portion of the structure of Figs. 5, 6 and 7;

Fig. 9 is a transverse sectional view taken through a piece of apparatus involved in the performance of the method herein disclosed;

Fig. 10 is a transverse sectional view taken along the line X—X of Fig. 9, looking in the direction indicated by the arrows;

Fig. 11 is an enlarged fragmentary view of a portion of the apparatus shown in Figs. 9 and 10;

Fig. 12 is a transverse sectional view of a portion of the apparatus shown in Figs. 8 and 9 with certain parts removed and replaced by others;

Fig. 13 is a sectional view taken along the line XIII—XIII of Fig. 12, looking in the direction indicated by the arrows; and Fig. 14 is an enlarged fragmentary view of a portion of the apparatus shown in Figs. 12 and 13.

In gears of the locked-train type, where the driving torque from the high-speed pinion is transmitted to two high-speed gears, the division of torque between these two gears depends upon the angular relation of the latter. In order that equal torques may be transmitted to each gear, the angular relationship thereof must be accurately set at the time of assembly of the gear train. This setting must take into account the backlash in the teeth of all gears and couplings, all bearing clearances and all strains in the stressed parts of the gear train.

These factors can best be taken into account by actually applying torque sufficient to lift all rotating parts into their running positions and to take up all backlashes. With torque thus applied, the angular relation between any two adjoining elements can be determined and/or set at any predetermined angle.

In order to clearly disclose the novel features of the subject invention, the same has been illustrated as applied to conventional reduction gearing of the locked-train type as is frequently used in the propulsion equipment of vessels, where two sources of power, for example, the high-pressure turbine and the low-pressure turbine, drive through two trains of reduction gearing to a single propeller shaft.

In Figs. 1, 3 and 4, the two trains are indicated as A and B, it being assumed that the train A transmits power from the high-pressure turbine and train B from the lower-pressure turbine, to drive a single propeller shaft 34 (Fig. 1).

Inasmuch as the two trains of gearing are similar, it is believed that a description of one train will be sufficient to fully disclose the present invention, and hence the following description is given of train A.

This train comprises a high-speed pinion shaft 11 on which is secured the high-speed pinion 12, which meshes with a pair of high-speed gears 13 and 14, mounted on hollow shafts 15 (Fig. 2). Each hollow shaft is journaled in bearings 16 carried by frame structure 17, and transmits torque, through a quill drive, to the hollow shaft 19, which is longitudinally aligned with, but independent of, the hollow shaft 15, except for the connection through the quill drive.

The quill drive comprises a coupling sleeve 21, having flange 22 secured to the flange 23 of the hollow shaft 15, by suitable means, such as the bolts 24.

The coupling sleeve is provided with internal teeth 26 adapted to mesh with external teeth 27 provided on the coupling hub 28, secured to the end of the quill shaft 29 by a suitable means, such as keys 30.

The other end of the quill shaft 29 is secured to the hollow shaft 19 by keys 31, the shaft 19 being rotatably supported by the bearings 32, likewise carried by the frame 17.

Mounted on each hollow shaft 19 is a low-speed pinion 20, these pinions both meshing with a single low speed, or "bull" gear 33, keyed to the main shaft 34, which either carries the propeller or is coupled to the propeller shaft. The entire gear assembly is enclosed by suitable casing structure, indicated at 35.

In performing the method of the present invention, the gear trains are completely assembled with the exception of the coupling hub 28 of the upper quill shaft of each train. In place of the omitted coupling hubs, the torque-measuring apparatus, disclosed in Figs. 5, 6 and 7, is inserted. This apparatus comprises a torquing hub 40 on which is rotatably mounted a torquing sleeve 41. The torquing hub is rabbeted at 42 to receive the corresponding internal rib or flange 43 formed on the torquing sleeve 41, and the two parts are retained in assembled relation by a segmental retaining ring 44, fitting into a mating groove 45 formed in the rabbeted surface 42 of the torquing hub 40, the retaining ring being secured to the torquing sleeve by suitable means, such as the bolts 46.

The torquing sleeve 41 is provided with external teeth 48 corresponding to the teeth 27 of the coupling hub for which this apparatus is substituted, the teeth 48 being adapted to mesh with the internal teeth 26 on the coupling sleeve 21. The torquing hub 40 is provided with keyways 49 adapted to cooperate with the keyways 50 of the quill shaft to receive temporary keys 51, locking the torque hub to the quill shaft. Thus, it will be seen that the torquing hub 40 may receive or transmit torque from or to the quill shaft 29 and the torquing sleeve 41 may receive or transmit torque from or to the coupling sleeve 21. At the same time, the torquing sleeve and torquing hub are rotatable relative to each other.

In order that the relative angular position of the torquing sleeve and torquing hub may be determined, the former is provided with a radially-extending pin 52 and the latter with a similar pin 53, there being provided an opening 54 in the torquing sleeve through which the pin 53 extends, the opening 54 being of sufficient circumferential extent to permit of the necessary relative movement of the torquing sleeve and torquing hub, without contact of the pin 53 with the end walls of the opening 54. The distance between or across the heads of the pins 52 and 53 may be accurately measured by a micrometer in order to determine the exact angular relationship of the torquing sleeve and torquing hub at any time.

To resist relative rotation of the torquing sleeve and torquing hub, in order that the entire gear train may be subjected to sufficient torque to take up play in the bearings and backlash of the teeth, there is provided a torquing jig 61, adapted to cooperate with the torquing sleeve and torquing hub in the manner to be immediately described.

The torquing hub is provided at its outer or free end with a pair of opposed enlarged portions 56 and the torquing sleeve has similar portions 57, normally positioned approximately 90° with respect to the portions 56 on the torquing hub. The enlarged portions 56 of the torquing hub are provided with axially-extending abutment members 58 in the form of headed pins, and similar abutments 59 are provided upon enlarged portions 57 of the torquing sleeve, for the purpose to be hereinafter disclosed.

The torquing jig 61 (Figs. 5 and 6) comprises a lower block 62 and an upper block 63 disposed in spaced-apart relation upon a rod 64. Movement of the lower block 62 toward the adjacent end of the rod 64 is limited by the nut 65 threaded on that end of the rod. The other end of the rod is surrounded by a compression spring 66, restrained between the washer 67 resting against the nut 68 on the rod 64, and the upper block 63, with the result that the blocks 62 and 63 are normally urged toward each other by the spring 66. The upper block 63 carries a pair of link members 70 and 71 pivotally connected thereto at one end by pins 72 extending through the links and the block, and retained by cotter pins 73. The free ends of the link members 70 and 71 are concaved, at 74, to engage with the shanks of the abutment pins 58 and 59 (Fig. 5). The lower block 62 is provided with similar link members 76 and 77, pivotally connected thereto by pins 78 having concaved ends engaging the pin abutments 58 and 59.

In order to prevent buckling of the rod 64 of the torquing jig 61, there is provided a restraining frame 80 secured to the torquing hub by suitable means such as the screws 81.

It will be apparent that the compressive stresses in the spring 66, urging the upper block 63 toward the block 62, will transmit forces through the links 70 and 77 tending to rotate the torquing sleeve 41 counterclockwise as viewed in Fig. 6, while the forces exerted through the links 71 and 76 will tend to rotate the torquing hub 40 clockwise. With the torquing sleeve and torquing hub thus torqued, torque may be applied to the high-speed pinion, with the low-speed gear restrained from rotating, sufficient to lift all the parts into their running positions and to eliminate backlash, as will be hereinafter described.

In order to apply a measured torque to the entire gear train, there is provided a further torquing apparatus, indicated generally at 89, for applying torque to the high-speed pinion and for preventing rotation of the low-speed gear. As best shown in Fig. 1, this apparatus comprises a pair of torquing arms 90 and 91, the arm 90 being secured to the shaft carrying the high-speed pinion of train A, by suitable means, such as bolts 92. In like manner, the arm 91 is secured to the shaft carrying the high-speed pinion of the train B, by similar bolts 92. The free ends of the arms 90 and 91 are connected by a rod 93, one end of which extends slidably through a block 94, preferably supported between a pair of ears 95, carried by the arm 90. This end of the rod 93 is threaded, as at 96, and carries an adjusting nut 97 for increasing or decreasing the effective length of the rod 93.

The other end of the rod is fixedly secured to a plate 99, slidably mounted on a pair of spaced rods 100, supported by a block 101, connected by a pair of ears 102 and pin 103 to the free end of the torquing arm 91. A plate 104 is slidably mounted on the pair of rods 100, at the opposite side of the plate 99 from the block 101. The rods 100 have threaded terminal portions extending through the plate 104 and carrying adjusting nuts 105 for moving the plate 104 toward or away from the block 101 to vary the compression of spring 106, disposed between said plate 104 and the plate 99 in which the end of the rod 93 is secured. Thus, it will be apparent that the compression spring 106 tends to urge the free ends of the torquing arms 90 and 91 toward each other.

In Figs. 9 to 13 there is illustrated apparatus for performing a further step in the process herein disclosed. This apparatus comprises a base plate 85, to which may be bolted the coupling sleeve 21 or a suitable sleeve having similar internal teeth. A dummy quill shaft 86 is mounted on the base plate 85, in concentric relation to the coupling sleeve 21, and is retained in position by the stud 87 and nut 88. Thus, there is provided between the dummy quill shaft and the coupling sleeve an annular space for reception of the torquing hub 40 and torquing sleeve 41 in their assembled relation (Figs. 9 and 10).

The torquing apparatus hereinbefore described is used in the following manner to provide for equal division, between the two high-speed gears, of the torque from the high-speed pinion.

1. The gear trains are completely assembled with the exception of the coupling hubs 28 of the upper quill shafts 29.
2. The torquing hub is placed inside the torquing sleeve and the two substituted for the omitted coupling hub 28 of train A, with the teeth 48 of the torquing sleeve in engagement with the teeth 26 of the coupling sleeve, and with the torquing hub temporarily keyed to the quill shaft 29 (Fig. 6).
3. The torquing jig 61 is applied to the torquing sleeve with the link members 71 and 76 engaging the abutment pins 58 of the torquing hub and with the links 70 and 77 engaging the abutment pins 59 of the torquing sleeve (Fig. 5).
4. Note is made of the number of the particular tooth 48 on the torquing sleeve which is positioned between the two marked teeth 26 of the coupling sleeve (Fig. 8).
5. The torquing arms 90 and 91 and associated rod and spring structure 93 and 106 are mounted on the high-speed pinion shafts in the manner illustrated in Figs. 1 and 3, assuming that the torquing jig 61 has been applied to the gear train A.
6. The springs 66 and 106 are adjusted to the correct compression which can be determined in any conventional way, as will be obvious to those skilled in the art. The torque exerted by spring 66 is made equal to one-half of the total torque that spring 106 exerts on both upper and lower gears.
7. The gears are rolled in either direction several times by applying force to both of the torquing arms in succession, and the distance between or over the measuring pins 52 and 53 measured with a micrometer or similar suitable instrument. Preferably, the rolling and measuring are repeated several times and the average of the readings taken.
8. The springs 66 and 106 are released, the torquing sleeve and torquing hub removed, but still retained in assembled relation, and the coupling sleeve is removed. If, at this stage, a temporary or dummy sleeve is used, it is unnecessary to remove it.
9. The coupling or temporary sleeve is bolted to the temporary base plate 85 concentric with the dummy quill shaft 86, also bolted to the plate 85.
10. The torquing sleeve and torquing hub are assembled on the dummy quill shaft and sleeve. The same numbered tooth on the torquing sleeve, as previously recorded, must be between the two marked teeth of the coupling sleeve, as when previously assembled in the actual gear assembly.
11. The torquing hub is keyed to the dummy quill shaft.
12. The dummy quill shaft and the torquing hub are rotated relative to the torquing sleeve and coupling sleeve until the dimension between or over the measuring pins 52 and 53 corresponds to the average measured dimension previously obtained (step 7).

*Note.*—Care should be taken to rotate the torquing hub and dummy quill shaft in the same direction as when the torque was applied to the assembled gear train, that is, with the teeth in contact on their ahead driving faces, which, in the case of marine propulsion gearing, would be with the apparatus driving ahead.

13. The dummy quill shaft is clamped in this position by tightening the nut 88 on the stud 87.
14. The torquing hub and torquing sleeve are removed from the dummy quill shaft and the coupling hub 28 assembled in place thereof between the coupling sleeve 21 and the dummy quill shaft 86, the external teeth 27 of the coupling hub engaging the internal teeth 26 of the coupling sleeve. The tooth 27 of the coupling hub, which lies between the two marked teeth 26 of the coupling sleeve, is provided with a corresponding mark so that it may always be assembled in the same relation thereto (Fig. 14).
15. Keyways are scribed on the coupling hub in line with the keyways on the dummy quill shaft.
16. The coupling hub is removed and keyways formed therein at the locations indicated by the scribe marks.
17. The coupling hub and coupling sleeve are removed from the base plate 85 and reassembled in the gear train, the coupling flange being bolted to the hollow shaft 15 and the coupling hub being keyed to the gear shaft 29.

This completes the operation of equally dividing between the two high-speed gears, the torque transmitted thereto by the high-speed pinion for the gear train A. The same procedure is followed with respect to the train B, except that the torquing arms 90 and 91, the rod 93 and spring mechanism 106 are applied in inverted position in the manner illustrated in Fig. 4.

While the invention has been shown in but one form, it will be obvious to those skilled in the art that it is not so limited, but is susceptible of various changes and modifications without departing from the spirit thereof.

This application is a division of copending application, Serial No. 482,977, filed April 14, 1943, for Gear timing apparatus.

What is claimed is:

1. Apparatus for applying equal and opposite torques to adjacent elements of a gear train at each side of a point whereat said gear train is interrupted, comprising nested inner and outer cylindrical members relatively rotatable about a common axis, means providing a driving connection between said inner member and one of said adjacent elements, means providing a driving connection between said outer member and the other of said adjacent elements, and means for applying equal and opposite torques to said inner and outer elements tending to rotate one relative to the other about their common axis, said last-mentioned means comprising a pair of spaced blocks, means connecting one of said blocks to said inner cylindrical member, means connecting the other of said blocks to said outer cylindrical member, whereby movement of said blocks towards each other imparts rotary motion to said inner and outer cylindrical members in opposite directions, and resilient means urging said blocks towards each other, said means which connect the blocks to the cylindrical members transmitting the force of said resilient means from said blocks to said cylindrical members.

2. The structure as specified in claim 1 including a pair of spaced and circumferentially-aligned indicating members, one carried by the inner cylindrical member and one carried by the outer cylindrical member, whereby the relative angular relationship of said inner and outer cylindrical members may be determined.

HAROLD W. SEMAR.

REFERENCES CITED

The following references are of record in the file of this patent:

UNITED STATES PATENTS

| Number | Name | Date |
|---|---|---|
| 1,551,844 | Parsons et al. | Sept. 1, 1925 |
| 1,751,650 | Nieman | Mar. 25, 1930 |
| 1,720,582 | Vieweg | July 9, 1929 |
| 1,304,242 | Alquist | May 20, 1919 |
| 1,828,305 | Zeder et al. | Oct. 20, 1931 |